(12) United States Patent
Kanno

(10) Patent No.: US 7,662,494 B2
(45) Date of Patent: Feb. 16, 2010

(54) FUEL CELL SYSTEM

(75) Inventor: Yoshihito Kanno, Numazu (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 425 days.

(21) Appl. No.: 10/573,987

(22) PCT Filed: Aug. 24, 2005

(86) PCT No.: PCT/IB2005/002511

§ 371 (c)(1),
(2), (4) Date: May 11, 2006

(87) PCT Pub. No.: WO2006/021866

PCT Pub. Date: Mar. 2, 2006

(65) Prior Publication Data

US 2007/0128481 A1 Jun. 7, 2007

(30) Foreign Application Priority Data

Aug. 25, 2004 (JP) .............................. 2004-244676

(51) Int. Cl.
*H01M 8/04* (2006.01)
(52) U.S. Cl. .............................. 429/22; 429/17; 429/24
(58) Field of Classification Search .................. 429/17, 429/22, 34
See application file for complete search history.

(56) References Cited

U.S. PATENT DOCUMENTS 5,853,910 A * 12/1998 Tomioka et al. ............... 429/17

| 2001/0053469 | A1 | 12/2001 | Kobayashi et al. |
| 2002/0182456 | A1 | 12/2002 | Condit et al. |
| 2003/0219636 | A1 | 11/2003 | Kaufmann |

FOREIGN PATENT DOCUMENTS

| JP | A 8-500931 | 1/1996 |
| JP | T 8-500931 | 1/1996 |
| JP | A 8-124588 | 5/1996 |
| JP | A 9-312164 | 12/1997 |
| JP | A 2003-115317 | 4/2003 |
| JP | A 2003-187846 | 7/2003 |
| JP | A 2004-22487 | 1/2004 |

* cited by examiner

*Primary Examiner*—Patrick Ryan
*Assistant Examiner*—Thomas H. Parsons
(74) *Attorney, Agent, or Firm*—Oliff & Berridge, PLC

(57) ABSTRACT

When an operation of a fuel cell system (100) is stopped, a flow of cathode off-gas into a circulation passage (28) is stopped. A stopped state of the flow of the cathode off-gas into the circulation passage (28) is held even after a start-up of the system (100) until the fuel cell (10) is brought into a predetermined state. Such structure prevents an outlet (52) of a three-way valve (50) from being frozen in an opened state. Accordingly the cathode off-gas that contains large amount of water and nitrogen hardly flows into the fuel cell (10) accidentally. This makes it possible to restrain various types of trouble, for example, generation of flooding upon start-up of the system, decrease in the oxygen partial pressure, and decrease in the power generation efficiency resulting therefrom.

12 Claims, 4 Drawing Sheets

FUEL CELL SYSTEM

BACKGROUND OF THE INVENTION

1. Field of Invention

The invention relates to a fuel cell system, and more particularly, to a fuel cell system which serves to circulate cathode off-gas to a fuel cell so as to humidify an electrolyte membrane.

2. Description of Related Art

In the case where the fuel cell is of a polymer electrolyte membrane type, in which an electrolyte membrane is interposed between an anode and a cathode, the electrolyte membrane has to be sufficiently humidified so as to improve the proton conductivity. Published Japanese Translation of PCT application, JP-T-8-500931 discloses the technology in which a vapor-containing cathode off-gas that has been generated through an electrochemical reaction in the fuel cell is partially circulated together with an oxygen-containing gas (air) so as to easily humidify the electrolyte membrane. Japanese Patent Application Publication No. 2004-22487A may also be regarded as being relevant to the invention.

There may be the case where water contained in the cathode off-gas freezes the valve for controlling circulation of the cathode off-gas when the system is stopped under a low-temperature environment. The frozen valve in the opened state fails to appropriately control the circulation amount of the cathode off-gas after start-up of the system. This may supply excessive amount of the vapor- or nitrogen-containing cathode off-gas to the fuel cell, resulting in flooding. The partial pressure of the oxygen in the oxygen-containing gas is reduced to deteriorate the power generation efficiency.

SUMMARY OF THE INVENTION

It is an object of the invention to provide a fuel cell system in which the cathode off-gas is circulated to the fuel cell so as to restrain various types of trouble caused when the fuel cell system is stopped under the low-temperature environment.

According to an aspect of the invention, a fuel cell system includes a fuel cell provided with an electrolyte membrane, a circulation passage through which a cathode off-gas discharged from a cathode of the fuel cell is supplied to a passage for supplying an oxygen-containing gas to the fuel cell, a flow control unit that controls a flow of the cathode off-gas in the circulation passage, a stop control unit that stops the flow of the cathode off-gas in the circulation passage by controlling the flow control unit when the fuel cell system is stopped, and a start-up control unit that controls the flow control unit after start-up of the fuel cell system until the fuel cell is brought into a predetermined operation state so as to hold the flow of the cathode off-gas in the circulation passage in a stopped state.

In the above-mentioned aspect, when stopping the above-structured fuel cell system, the flow of the cathode off-gas is stopped, and thereafter, the state where the flow of the cathode off-gas in the circulation passage is stopped will be continued until the fuel cell becomes a predetermined state. Even if the system is started in the state where the flow control unit is in a non-operational state as it is frozen under the low temperature environment upon stopping of the system operation, the cathode off-gas with high water or nitrogen content hardly flows into the fuel cell accidentally. This makes it possible to restrain various types of trouble, for example, flooding upon start-up of the system, decrease in the oxygen partial pressure, and decrease in the power generation efficiency caused thereby.

In the above-structured fuel cell system, the flow control unit may include an inlet that admits the cathode off-gas discharged from the cathode, a first outlet to which the circulation passage is connected, a second outlet through which the cathode off-gas is discharged to a passage other than the circulation passage, and a selector valve having a valve body, which selects between the first outlet and the second outlet for discharging the cathode off-gas admitted through the inlet. The stop control unit may be structured to close the first outlet that has been selected by the selector valve so as to stop the flow of the cathode off-gas in the circulation passage. The start-up control unit may be structured to hold the first outlet that has been selected by the selector valve closed so as to hold the flow of the cathode off-gas in the circulation passage in the stopped state.

In the above-described structure, the selector valve makes it possible to easily control the flow of the cathode off-gas into the circulation passage. The selector valve may be a three-way valve that includes one inlet and two outlets. The second outlet may be connected to a passage for discharging the cathode off-gas into the atmosphere. The flow of the cathode off-gas into the circulation passage may be controlled by a pump provided within the circulation passage. The switching valve may be provided and operated in the circulation passage so as to control the flow of the cathode off-gas.

In the above-structured fuel cell system, the operation state of the fuel cell may be represented by an amount of water contained in the electrolyte membrane. The start-up control unit may be structured to hold the stopped state of the flow of the cathode off-gas until the amount of water becomes equal to or smaller than a predetermined amount.

The aforementioned system may hold the circulation of the cathode off-gas supplied by the flow control unit in the stopped state until water contained in the electrolyte membrane becomes insufficient. Accordingly this may restrain the flooding or decrease in the oxygen partial pressure upon start-up of the system. The possibility that the flow control unit freezes the cathode off-gas in the circulated state may be reduced so as not to unnecessarily circulate the cathode off-gas.

In the above-structured fuel cell system, the operation state of the fuel cell is represented by an operation temperature of the fuel cell. The start-up control unit may be structured to hold the stopped state of the flow of the cathode off-gas until the operation temperature becomes higher than a predetermined temperature.

In the above-structured fuel cell system, the start-up control unit may be structured to execute a start-up control based on a predetermined map such that a circulation amount of the cathode off-gas becomes zero when the operation temperature is equal to or lower than the predetermined temperature.

In the above-structured fuel cell system, the operation state of the fuel cell may be represented by a total power generation amount accumulated from the start-up of the fuel cell. The start-up control unit may be structured to hold the stopped state of the flow of the cathode off-gas until the total power generation amount exceeds a predetermined amount.

In the above-structured fuel cell system, the operation state of the fuel cell may be represented by an elapsed time from the start-up of the fuel cell. The start-up control unit may be structured to hold the stopped state of the flow of the cathode off-gas until the elapsed time reaches a predetermined time.

In the above-structured fuel cell system, the operation state of the fuel cell may be represented by a hydrogen consumption amount obtained from the start-up of the fuel cell. The start-up control unit may be structured to hold the stopped state of the flow of the cathode off-gas until the hydrogen consumption amount reaches a predetermined amount.

In the aforementioned system, the operation state of the fuel cell may be represented by the operation temperature of the fuel cell, the total amount of generated power from the start-up of the fuel cell, the elapsed time counted from the start-up of the fuel cell, and the hydrogen consumption amount, based on which it is determined whether the flow of the cathode off-gas in the circulation passage is to be held in the stopped state. If the operation temperature is relatively high, it is determined that the water content of the electrolyte membrane is insufficient as more water is vaporized therefrom. If the total amount of generated power is large, or the time elapsing from the start-up of the fuel cell is long, or the hydrogen consumption amount is large, it may be considered that the operation temperature of the fuel cell has been increasing. It is therefore determined that the water content of the electrolyte membrane is decreasing. Even if the aforementioned operation states are used for determining the operation state, it is possible to determine whether the water content of the electrolyte membrane becomes insufficient. This makes it possible to restrain the flooding, decrease in the oxygen partial pressure.

In the above-structured fuel cell system, the stop control unit may be structured to execute a stop control based on an outside temperature.

The invention may be formed as a method of operating a fuel cell system including supplying an oxygen-containing gas to a fuel cell provided with an electrolyte membrane, circulating a cathode off-gas discharged from a cathode of the fuel cell to a passage through which the oxygen-containing gas is supplied, stopping a circulation of the cathode off-gas when the fuel cell system is stopped, and holding the circulation of the cathode off-gas in a stopped state until the fuel cell is brought into a predetermined operation state after start-up of the fuel cell system.

BRIEF DESCRIPTION OF THE DRAWINGS

The foregoing and further objects, features and advantages of the invention will become apparent from the following description of preferred embodiment with reference to the accompanying drawings, wherein like numerals are used to represent like elements and wherein.

DETAILED DESCRIPTION OF PREFERRED EMBODIMENTS

The invention will be described with respect to sections, that is, A. Structure of the fuel cell system, B. Circulation control of the cathode off-gas, and C. Modified example, in the embodiments such that the effects of the invention will be further clarified.

Figure 1:
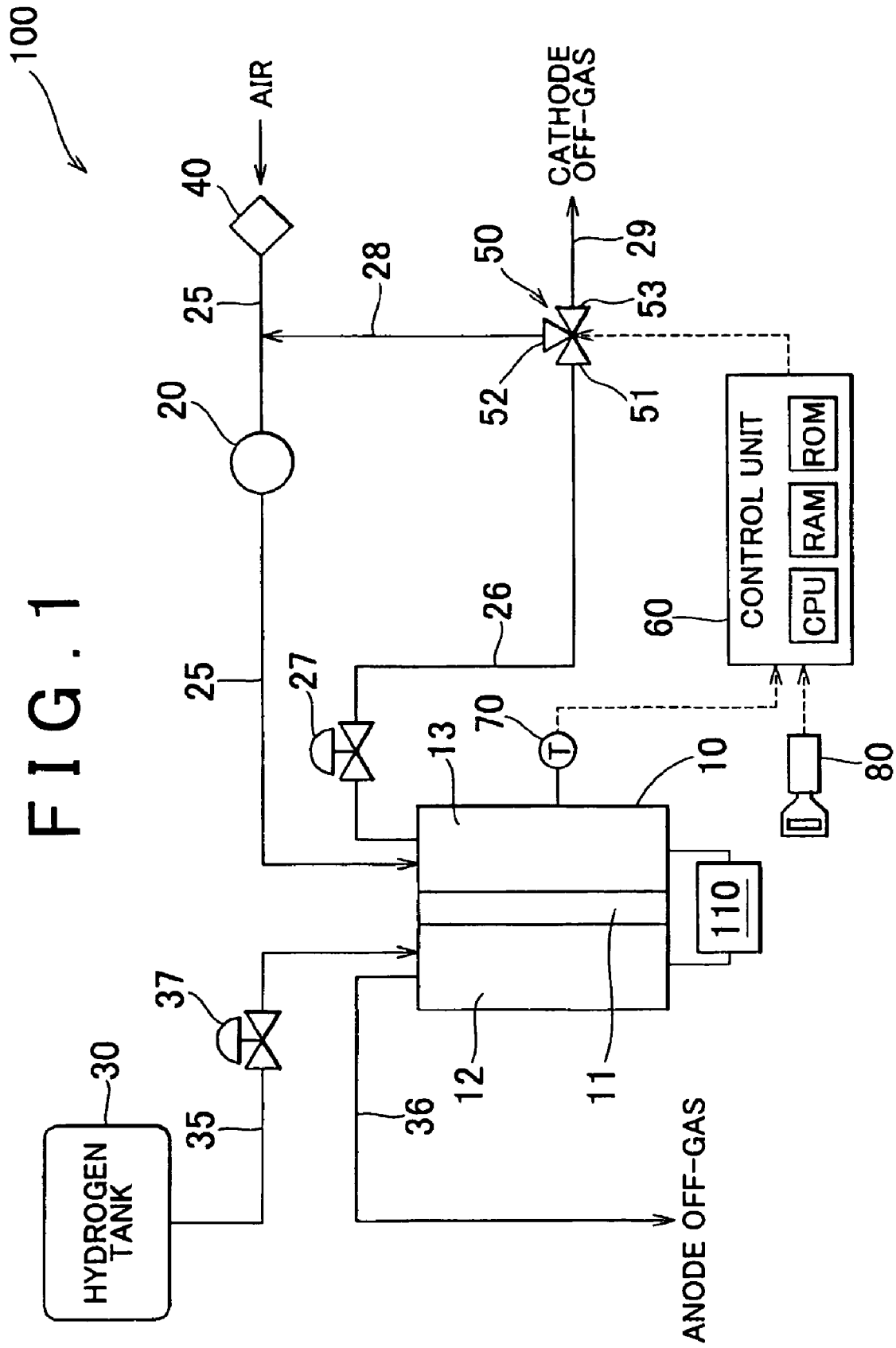
FIG. 1 is a view that schematically shows a structure of a fuel cell system 100.

A. Structure of Fuel Cell System:

FIG. 1 is a view that schematically shows the structure of the fuel cell system of the embodiment according to the invention. A fuel cell system 100 is employed as a power source of a motor 110 serving as a source of power for an electric vehicle, for example.

Referring to FIG. 1, the fuel cell system 100 includes a fuel cell 10 that generates power upon receipt of hydrogen and oxygen, a compressor 20 that supplies compressed air into the fuel cell 10, a hydrogen tank 30 that stores hydrogen under the high pressure state, a control unit 60 that executes various types of control with respect to the fuel cell system 100 and the like.

The fuel cell 10 is a fuel cell of polymer electrolyte membrane type, which generates power through an electrochemical reaction between hydrogen and oxygen. The fuel cell 10 has a stack structure formed by stacking a plurality of single cells. Each of the single cells has an electrolyte membrane 11 with good proton conductivity in the wet state, for example, Nafion®. The electrolyte membrane 11 is interposed between a hydrogen electrode (hereinafter referred to as an anode) 12 and an oxygen electrode (hereinafter referred to as a cathode) 13. The fuel cell 10 in the drawing is schematically shown for easy understanding.

The hydrogen tank 30 is connected to the position upstream of the anode 12 of the fuel cell 10 via a hydrogen supply passage 35. The pressure of the hydrogen under the high pressure state, which has been discharged from the hydrogen tank 30 is reduced to a predetermined level by a pressure reducing valve 37 provided in the hydrogen supply passage 35 so as to be supplied into the anode 12. The hydrogen (anode off-gas) that has not been consumed for the electrochemical reaction within the fuel cell 10 flows through an anode off-gas passage 36 connected to the position downstream of the anode 12. The anode off-gas is further diluted by a diluting device (not shown) and discharged to the outside of the fuel cell system 100

The compressor 20 is connected to an air filter 40 via an air supply passage 25 at a position upstream of the cathode 13 of the fuel cell 10. Air as the oxygen-containing gas admitted by the air filter 40 is pressurized by the compressor 20 and flows through the air supply passage 25 into the cathode 13 of the fuel cell 10. Air having its oxygen consumed through the electrochemical reaction within the fuel cell 10, that is, the cathode off-gas is discharged through a cathode off-gas passage 26 connected to the position downstream of the cathode 13. The cathode off-gas passage 26 is provided with a pressure regulating valve 27 through which the pressure of air within the cathode 13 is adjusted.

The cathode off-gas passage 26 has its end connected to an inlet 51 of a three-way valve 50. The three-way valve 50 has the inlet 51 and two outlets 52, 53. The cathode off-gas that has been admitted through the inlet 51 may be selectively output to one of the outlets 52 and 53.

The first outlet 52 of the three-way valve 50 is connected to a circulation passage 28 that is connected between the compressor 20 and the air filter 40 in the air supply passage 25. The cathode off-gas is pressurized by the compressor together with air as it passes through the circulation passage 28, which is supplied to the cathode 13 of the fuel cell 10. Meanwhile, the second outlet 53 of the three-way valve 50 is connected to an exhaust passage 29 through which the cathode off-gas is discharged to the atmosphere.

The cathode off-gas that has been admitted by the three-way valve 50 is selectively output by the control unit. Upon receipt of an on signal from the control unit 60, the three-way valve 50 in the embodiment has its inner valve body moving to allow communication between the cathode off-gas passage 26 and the circulation passage 28. As an off signal is received, the cathode off-gas passage 26 is communicated with the exhaust passage 29. The control unit 60 executes the duty control of the on/off signal so as to adjust the flow rate of the cathode off-gas flowing through the circulation passage 28. In the embodiment, the three-way valve 50 serves as the flow control unit in the invention.

The control unit 60 is formed of a microcomputer that includes a CPU, a RAM, and a ROM therein. An input port of the CPU is connected to a starter switch 80 for starting the fuel cell system 100, and a temperature sensor 70 for detecting an operation temperature of the fuel cell 10. The CPU serves to execute the switching operation of the three-way valve 50 in accordance with the operation temperature of the fuel cell 10 which has been detected by a temperature sensor 70 under predetermined control program stored in the ROM while using the RAM as the work area. The temperature sensor 70 may be provided at an arbitrary position so long as it is allowed to detect the operation temperature of the fuel cell 10. For example, it may be attached to an enclosure of the fuel cell 10, or within the cathode off-gas passage 26. Alternatively it may be provided in a cooling system (not shown) for cooling the fuel cell 10. In the embodiment, the control unit 60 serves as the stop control unit and the start-up control unit as have been described above.

The electrochemical reaction within the fuel cell 10 will be described. In the fuel cell 10, the electrochemical reaction proceeds between hydrogen supplied from the hydrogen tank 30 into the anode 12 and oxygen contained in air that has been supplied by the compressor 20 into the cathode 13 as shown by the following formulae.

$$H_2 \rightarrow 2H^+ + 2e^- \qquad \text{formula (1)}$$

$$2H^+ + 2e^- + (\tfrac{1}{2})O_2 \rightarrow H_2O \qquad \text{formula (2)}$$

$$H_2 + (\tfrac{1}{2})O_2 \rightarrow H_2O \qquad \text{formula (3)}$$

The formula (1) represents the reaction on the anode 12, the formula (2) represents the reaction on the cathode 13, and the formula (3) represents the reaction that proceeds in the fuel cell 10 as a whole. As shown by the formula (1), the electron ($e^-$) generated in the reaction on the anode 12 moves to the cathode 13 through the outer circuit such as the motor 110 so as to be supplied to the reaction represented by the formula (2). The proton ($H^+$) generated in the reaction represented by the formula (1) permeates the electrolyte membrane 11 so as to move into the cathode 13, which is supplied to the reaction represented by the formula (2).

The reaction represented by the formula (2) generates water ($H_2O$) on the cathode 13. The thus generated water (produced water) is partially absorbed by the electrolyte membrane 11, and partially discharged together with the cathode off-gas. The amount of water that has been absorbed by the electrolyte membrane 11 fluctuates depending on the operation temperature of the fuel cell 10. That is, if the operation temperature of the fuel cell 10 is relatively low, for example, equal to or lower than 40° C., the amount of the produced water to be vaporized is small. Then it is determined that the electrolyte membrane 111 has a high water content. Meanwhile if the operation temperature of the fuel cell 10 is relatively high, for example, equal to or higher than 70° C., the produced water is vaporized so as to be discharged together with the cathode off-gas. As water contained in the electrolyte membrane 11 is also vaporized, it is determined that the water content of the electrolyte membrane 11 is reduced. In the fuel cell system 100 according to the embodiment, the circulation control routine is executed for the purpose of humidifying the electrolyte membrane 11 by supplying water-containing cathode off-gas into the cathode 13 through the circulation passage 28.

B. Circulation Control of Cathode Off-gas

Figure 2:
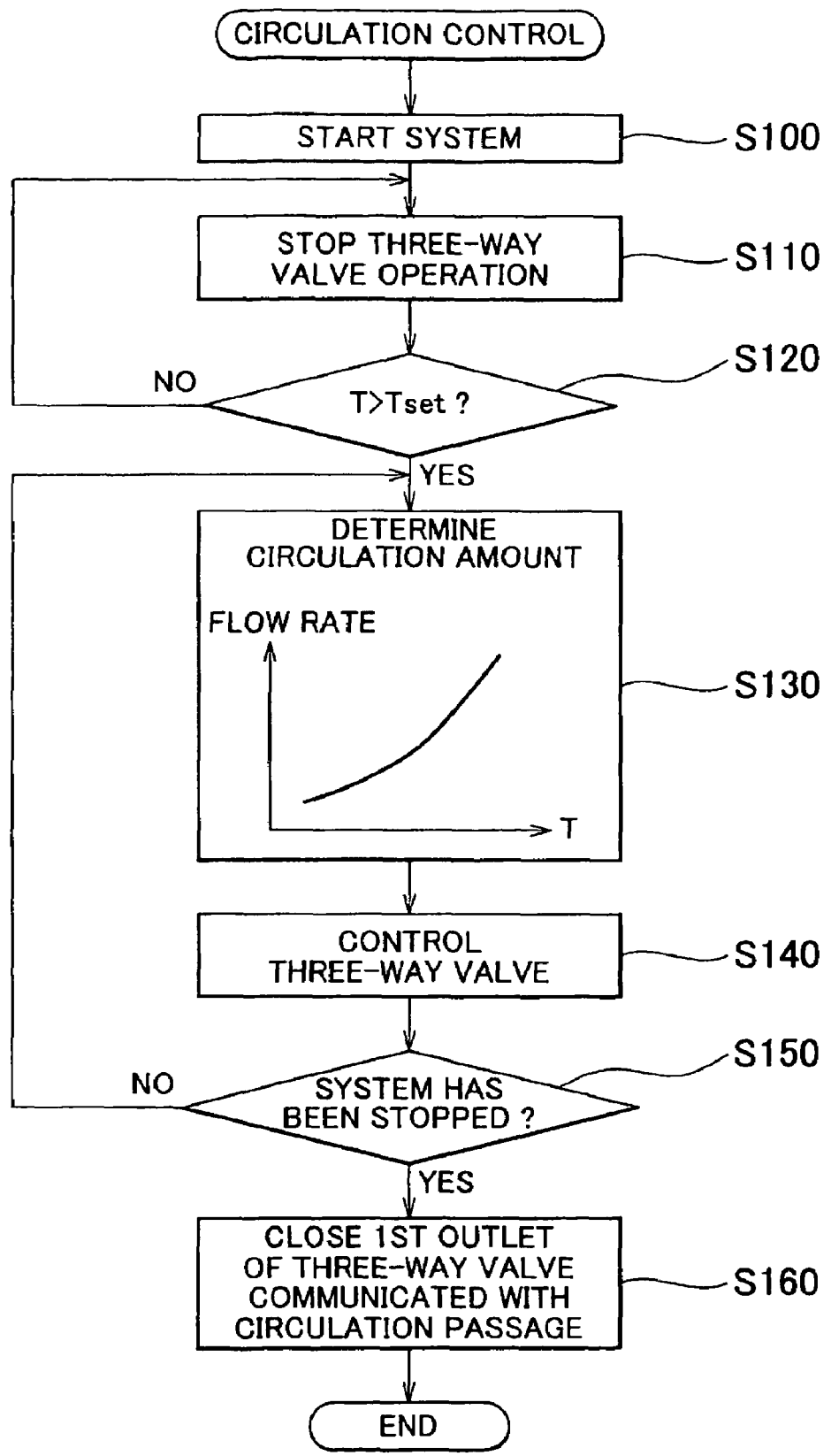
FIG. 2 is a flowchart that represents a circulation control routine.

FIG. 2 is a flowchart showing the circulation control routine executed by the control unit 60. The routine is continuously executed from the start-up of the fuel cell system 100 until it is stopped.

Referring to FIG. 2, when the fuel cell system 100 is started upon turning the starter switch 80 on in step S100, the control unit 60 stops the control of the three-way valve 50 in step S110. The operation temperature T of the fuel cell 10 is detected by the temperature sensor 70, which is compared with a predetermined non-humidifying upper limit temperature value Tset in step S120. The non-humidifying upper limit temperature Tset is set as the upper limit operation temperature of the fuel cell 10 that becomes sufficiently humidified with water generated in the electrochemical reaction with no need of humidification of the electrolyte membrane 11 with the cathode off-gas. In the embodiment, the non-humidifying upper limit temperature Tset may be set to 40° C.

If it is determined in step S120 that the operation temperature T is equal to or lower than the non-humidifying upper limit temperature Tset, that is, No is obtained in step S120, the process is returned to step S110 by the control unit 60 such that the control of the three-way valve 50 is continued to be held in the stopped state. As described hereinafter, when the fuel cell system 100 of the embodiment is stopped, the outlet 52 of the three-way valve 50 at the circulation passage 28 side is always closed. In the above-described procedure, the cathode off-gas is discharged to the atmosphere through the exhaust passage 29 without passing through the circulation passage 28 until the fuel cell system 100 is started and the operation temperature T of the fuel cell 10 exceeds the non-humidifying upper limit temperature Tset.

In step S120, if it is determined that the operation temperature T of the fuel cell 10 exceeds the non-humidifying upper limit temperature Tset, that is, Yes is obtained in step S120, the flow rate of the cathode off-gas to be fed into the circulation passage 28 is determined in accordance with the operation temperature T by the control unit 60 based on a predetermined map stored in the ROM in step S130. The graph shown in step S130 represents an example of the map based on which the circulation amount of the cathode off-gas is determined. Referring to the map, the higher the operation temperature T becomes, the more the circulation amount of the cathode off-gas becomes. Accordingly, larger amount of water may be supplied to the cathode 13.

When the circulation amount of the cathode off-gas is determined by the control unit 60 in step S130, the three-way valve 50 is controlled such that the determined amount of the cathode off-gas flows through the circulation passage 28 in step S140. Under the control, the control unit 60 outputs the on/off signal to the three-way valve 50 so as to increase a valve opening ratio of the first outlet 52 as the increase in the determined circulation amount of the cathode off-gas.

It is determined by the control unit 60 whether the fuel cell system 100 has been stopped upon turning of the starter switch 80 off in step S150. If the fuel cell system is not stopped, that is, No is obtained in step S150, the process is returned to step S130 again so as to continuously execute the circulation control of the cathode off-gas in accordance with the operation temperature T of the fuel cell 10. Meanwhile, if the system is stopped, that is, Yes is obtained in step S150, the off signal is sent to the three-way valve 50 to close the first outlet 52 so as not to allow the cathode off-gas to flow through the circulation passage 28 in step S160. The routine ends through execution of the procedures. In the present routine, the determination whether the fuel cell system 100 has been started or stopped is made based on the switching operation of the starter switch 80. Alternatively the start-up state of the fuel cell system 100 may be determined when no abnormality in the system is detected through a predetermined abnormality detection process after turning the starter switch 80 on. The stopped state of the fuel cell system 100 may also be determined when the amount of the hydrogen stored in the hydrogen tank 30 becomes equal to or lower than the predetermined level.

In the above-structured fuel cell system 100 of the embodiment, the outlet 52 of the three-way valve 50 at the circulation passage 28 is closed when the system is stopped. Being exposed under the low temperature environment after stopping the system, the outlet 52 is not frozen in the opened state. Accordingly, in the case where the fuel cell 10 is started at the non-humidifying upper limit temperature Tset or lower at which humidification with the cathode off-gas is not required, the cathode off-gas that contains sufficient water and nitrogen does not accidentally flow into the fuel cell 10. This may prevent the flooding, decrease in the oxygen partial pressure, and generation of resultant various adverse effects such as decrease in power generation efficiency.

Assuming that the outlet 52 is opened in the state where the three-way valve 50 is not frozen immediately after start-up of the fuel cell system 100, when the temperature around the three-way valve 50 is low, the valve body of the three-way valve 50 may be frozen by low temperature water or ice that has been fed together with the cathode off-gas. Accordingly, the three-way valve 50 may become out of control. In the fuel cell system 100 of the embodiment, the three-way valve 50 cannot be easily opened by holding the circulation of the cathode off-gas stopped until the operation temperature T of the fuel cell 10 after start-up of the system exceeds the non-humidifying upper limit temperature Tset. Accordingly this may eliminate the possibility of freezing the outlet 52 of the three-way valve 50 opened during operation of the system.

C. Modified Example

As has been described with respect to the embodiment of the invention, it is not limited to the above-described embodiment, and may be implemented in various forms without departing from the scope of the invention. For example, in the aforementioned embodiment, the outlet 52 of the three-way valve 50 is always closed upon stopping of the system so as to prevent the outlet 52 from being frozen in its opened state. Meanwhile, such control may be executed only when the determination with respect to the possibility of freezing the three-way valve 50 is made based on the detected outer temperature. The determination whether the three-way valve 50 is frozen or not is made based on such information as the weather forecast or the temperature forecast provided by the radio or internet in addition to the outer temperature. The invention may be modified as follows.

Modified Example 1

Figure 3:
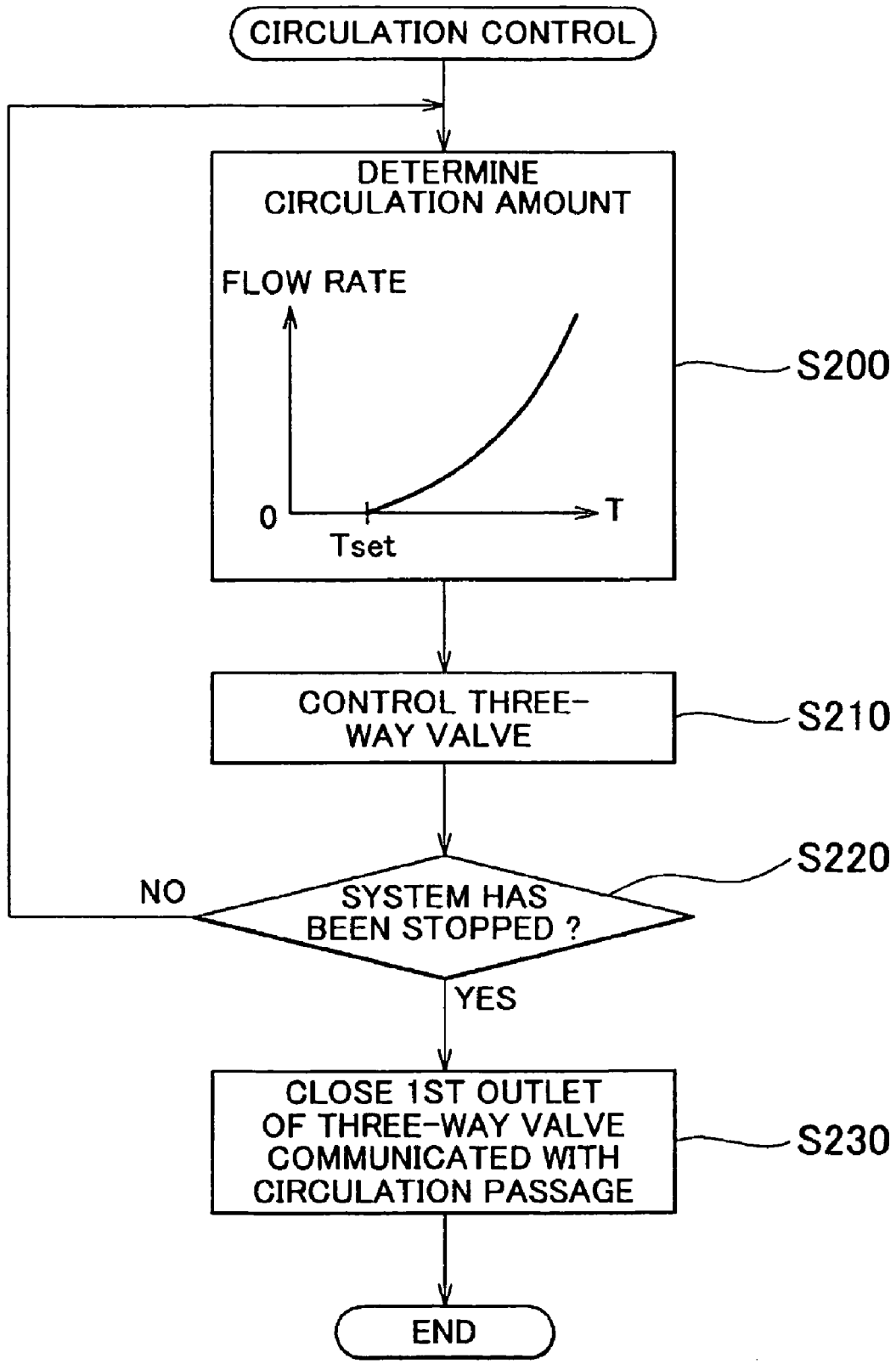
FIG. 3 is a flowchart that represents a modified example of the circulation control routine.

FIG. 3 is a flowchart as a modified example of the circulation control routine. As the flowchart of FIG. 2 shows, in the circulation control routine of the aforementioned embodiment, the circulation amount of the cathode off-gas is adjusted based on the map only when the operation temperature T of the fuel cell 10 exceeds the non-humidifying upper limit temperature Tset after starting the system. As step S200 of the flowchart of FIG. 3 shows, the same process may be executed by the use of the map in which it is preliminarily defined to set the circulation amount of the cathode off-gas to zero when the operation temperature T is equal to or lower than the non-humidifying upper limit temperature Tset.

In this modified example, as shown in FIG. 3, the circulation amount of the cathode off-gas in accordance with the operation temperature T is determined based on the map by the control unit 60 in step S200. If the operation temperature T of the fuel cell 10 is equal to or lower than the non-humidifying upper limit temperature Tset, the circulation amount of the cathode off-gas becomes zero. Then the three-way valve 50 is controlled such that the circulation amount becomes the determined value in step S210. Under the control, if the circulation amount of the cathode off-gas is zero, the outlet 52 of the three-way valve 50 is held closed. If the system is stopped, that is, Yes is obtained in step S220, the outlet 52 of the three-way valve 50 at the circulation passage 28 is closed in step S230. In the modified example, the circulation control of the cathode off-gas may be executed through simple process.

Modified Example 2

Figure 4:
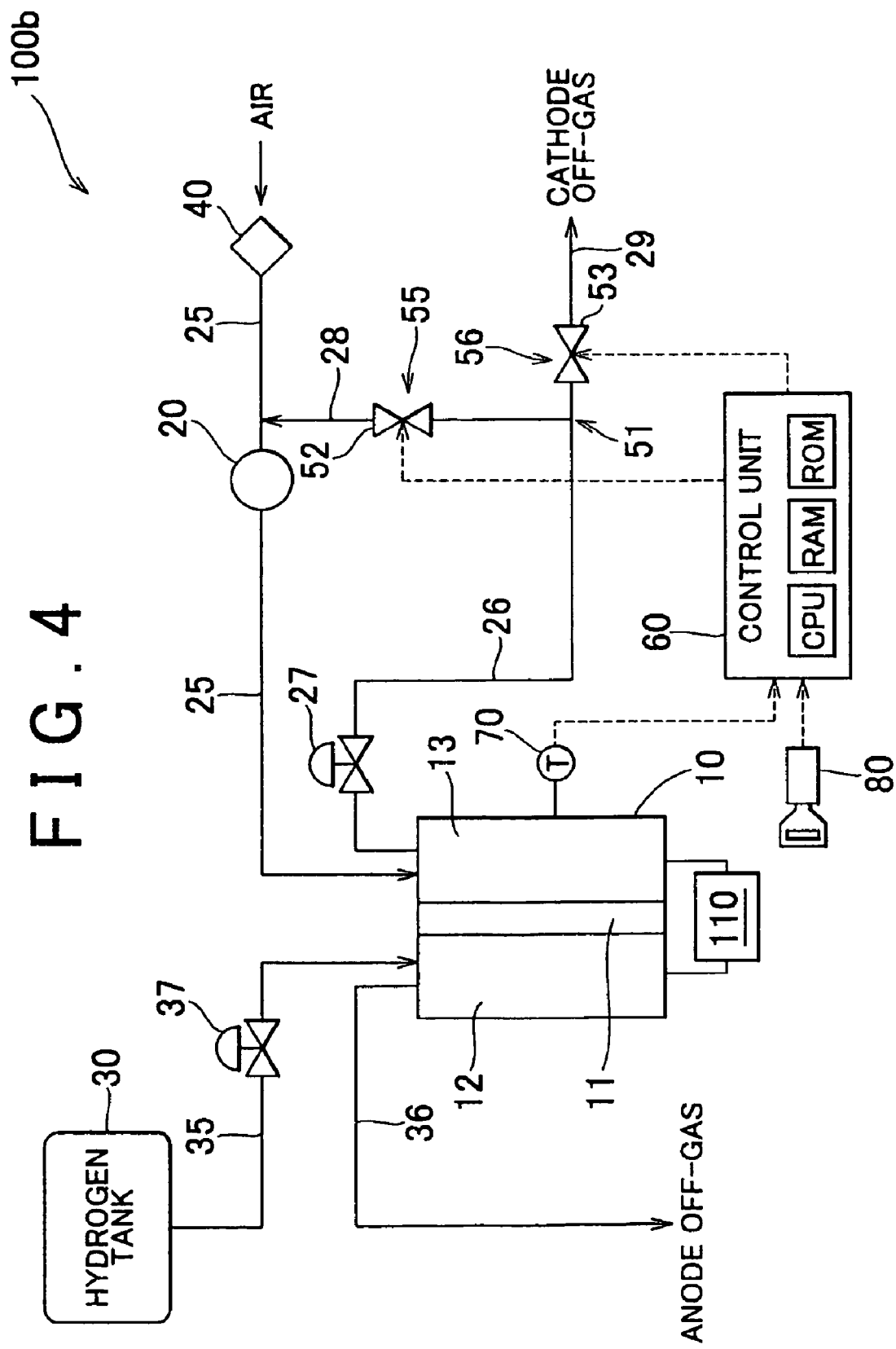
FIG. 4 is a view that schematically shows a structure of a fuel cell system 100b as a modified example.

FIG. 4 is a view that schematically shows a structure of a fuel cell system 100b as a modified example of the invention. In the above-described embodiment, the flow of the cathode off-gas to the circulation passage 28 is controlled by the three-way valve 50. Meanwhile, in the modified example, the circulation of the cathode off-gas is controlled by operating switching valves 55 and 56 respectively provided in the circulation passages 28 side and the exhaust passage 29. The cathode off-gas passage 26 has its end connected to an inlet 51. The inlet 51 is connected to circulation passage 28 through the switching valve 55, also inlet 51 is connected to the exhaust passage 29 through the switching valve 56. The switching valve 55 has a first outlet 52 and the switching valve 56 has a second outlet 53. In the modified example, the control unit 60 opens the switching valve 55 and closes the switching valve 56 for the purpose of flowing the cathode off-gas to the circulation passage 28. In order to stop the circulation of the cathode off-gas, the switching valve 55 is closed, and the switching valve 56 is opened. The above-structured system makes it possible to execute the circulation control of the cathode off-gas in the same way as in the embodiment. Alternatively, a pump may be provided in the circulation passage 28 instead of the switching valve 55 so as to control the circulation amount of the cathode off-gas.

Modified Example 3

In the aforementioned embodiment, as shown in steps S120 and S130 of the flowchart in FIG. 2, the operation temperature of the fuel cell 10 is detected, based on which it is determined whether the circulation of the cathode off-gas is started or not, or the circulation amount is adjusted. However the operation temperature may be estimated based on various operation states of the fuel cell as well as being directly detected by a temperature sensor 70.

For example, the operation temperature of the fuel cell 10 increases as elapse of time from the start-up of the system. The time elapsing from the start-up of the system is detected, based on which the operation temperature of the fuel cell is estimated. The operation temperature of the system is increased as the increase in the total power generation amount or the hydrogen consumption amount after start-up of the system. The operation temperature of the fuel cell may be estimated based on the aforementioned values that represent the state of the system. The time elapsing from the start-up of the system, the total power generation amount after the start-up of the system, and the hydrogen consumption amount may be detected as parameters, based on which the circulation amount of the cathode off-gas is controlled. Alternatively, the circulation control of the cathode off-gas may be executed by directly detecting the water content of the electrolyte membrane 11.

The invention claimed is:

1. A fuel cell system comprising:
a fuel cell provided with an electrolyte membrane;
a circulation passage through which a cathode off-gas discharged from a cathode of the fuel cell is supplied to a passage for supplying an oxygen-containing gas to the fuel cell;
a flow control unit that controls a flow of the cathode off-gas in the circulation passage;
a stop control unit that stops the flow of the cathode off-gas in the circulation passage by controlling the flow control unit when the fuel cell system is stopped; and
a start-up control unit that controls the flow control unit after start-up of the fuel cell system until the fuel cell is brought into a predetermined operation state so as to hold the flow of the cathode off-gas in the circulation passage in a stopped state.

2. The fuel cell system according to claim 1, wherein
the flow control unit includes an inlet that admits the cathode off-gas discharged from the cathode, a first outlet to which the circulation passage is connected, a second outlet through which the cathode off-gas is discharged to a passage other than the circulation passage, and a selector unit that selects between the first outlet and the second outlet for discharging the cathode off-gas admitted through the inlet;
the stop control unit closes the first outlet that has been selected by the selector unit so as to stop the flow of the cathode off-gas in the circulation passage; and
the start-up control unit holds the first outlet that has been selected by the selector unit closed so as to hold the flow of the cathode off-gas in the circulation passage in the stopped state.

3. The fuel cell system according to claim 2, wherein
the flow control unit includes an inlet that admits the cathode off-gas discharged from the cathode, a first outlet to which the circulation passage is connected, a second outlet through which the cathode off-gas is discharged to the passage other than the circulation passage, and a selector valve having a valve body, which selects between the first outlet and the second outlet for discharging the cathode off-gas admitted through the inlet;
the stop control unit closes the first outlet that has been selected by the selector valve so as to stop the flow of the cathode off-gas in the circulation passage; and
the start-up control unit holds the first outlet that has been selected by the selector valve closed so as to hold the flow of the cathode off-gas in the circulation passage in the stopped state.

4. The fuel cell system according to claim 2, wherein
the flow control unit includes the inlet that admits the cathode off-gas discharged from the cathode, the first outlet to which the circulation passage is connected, the second outlet through which the cathode off-gas is discharged to the passage other than the circulation passage, a first switching valve that allows the cathode off-gas admitted through the inlet to flow into the first outlet, and a second switching valve that allows the cathode off-gas admitted through the inlet to flow into the second outlet;
the stop control unit closes the first switching valve so as to stop the flow of the cathode off-gas in the circulation passage; and
the start-up control unit holds the first switching valve closed so as to hold the flow of the cathode off-gas in the circulation passage in the stopped state.

5. The fuel cell system according to claim 1, wherein:
the operation state of the fuel cell comprises an amount of water contained in the electrolyte membrane; and
the start-up control unit holds the stopped state of the flow of the cathode off-gas until the amount of water becomes equal to or smaller than a predetermined amount.

6. The fuel cell system according to claim 1, wherein:
the operation state of the fuel cell comprises an operation temperature of the fuel cell; and
the start-up control unit holds the stopped state of the flow of the cathode off-gas until the operation temperature becomes higher than a predetermined temperature.

7. The fuel cell system according to claim 6, wherein the start-up control unit executes a start-up control based on a predetermined map such that a circulation amount of the cathode off-gas becomes zero when the operation temperature is equal to or lower than the predetermined temperature.

8. The fuel cell system according to claim 1, wherein:
the operation state of the fuel cell comprises a total power generation amount accumulated from the start-up of the fuel cell; and
the start-up control unit holds the stopped state of the flow of the cathode off-gas until the total power generation amount exceeds a predetermined amount.

9. The fuel cell system according to claim 1, wherein:
the operation state of the fuel cell comprises an elapsed time from the start-up of the fuel cell; and
the start-up control unit holds the stopped state of the flow of the cathode off-gas until the elapsed time reaches a predetermined time.

10. The fuel cell system according to claim 1, wherein:
the operation state of the fuel cell comprises a hydrogen consumption amount obtained from the start-up of the fuel cell; and
the start-up control unit holds the stopped state of the flow of the cathode off-gas until the hydrogen consumption amount reaches a predetermined amount.

11. The fuel cell system according to claim 1, wherein the stop control unit executes a stop control based on an outside temperature.

12. A method of operating a fuel cell system comprising:
supplying an oxygen-containing gas to a fuel cell provided with an electrolyte membrane;
circulating a cathode off-gas discharged from a cathode of the fuel cell to a passage through which the oxygen-containing gas is supplied;
stopping a circulation of the cathode off-gas when the fuel cell system is stopped; and
holding the circulation of the cathode off-gas in a stopped state until the fuel cell is brought into a predetermined operation state after start-up of the fuel cell system.

* * * * *